Sept. 12, 1967        N. P. NILSEN        3,340,852
SELF-MAINTAINING POULTRY WATERER SYSTEM
Filed Jan. 12, 1966        2 Sheets-Sheet 1
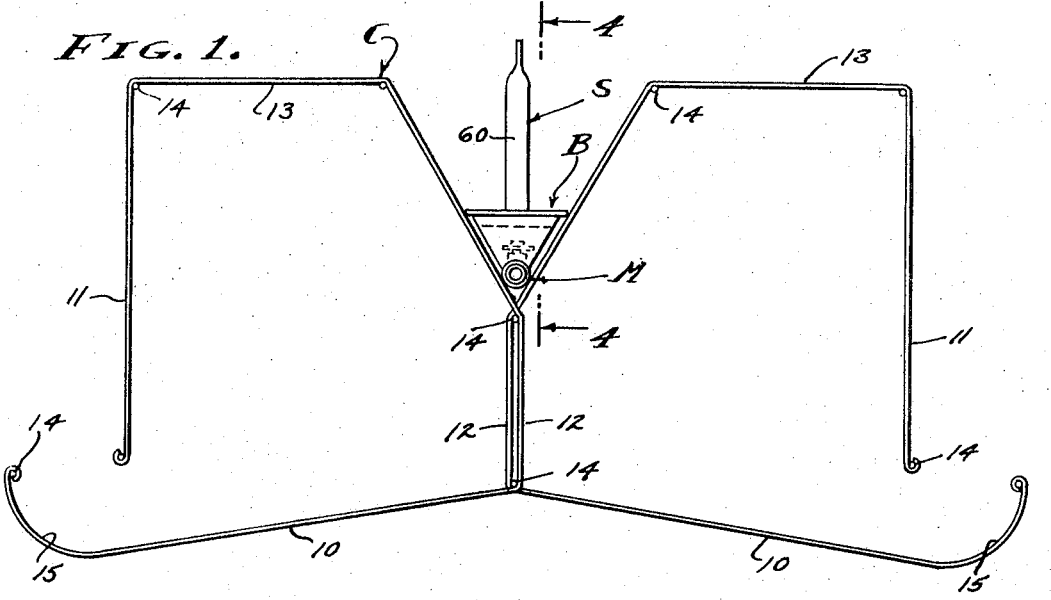
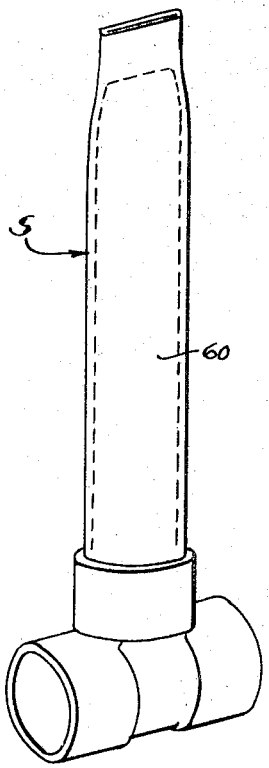
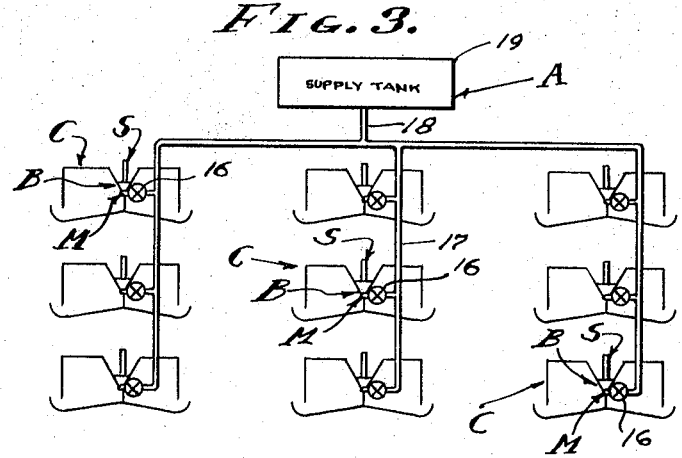
INVENTOR.
NORMAN P. NILSEN
BY
W. H. Maxwell
AGENT

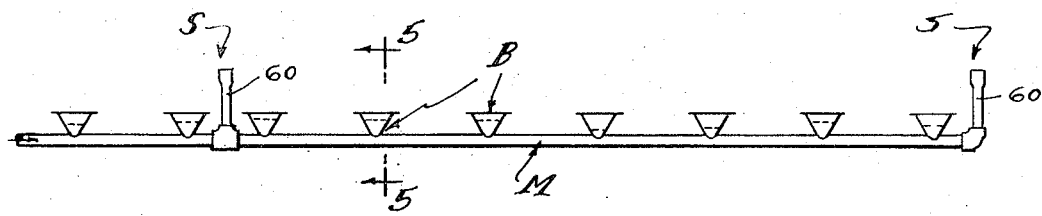
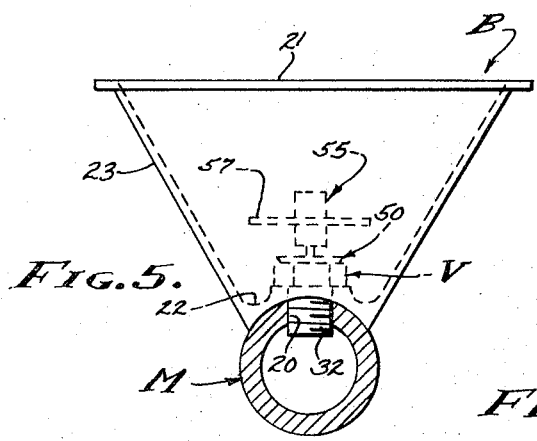
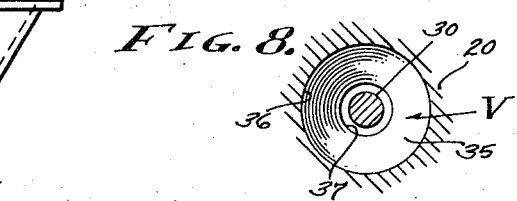
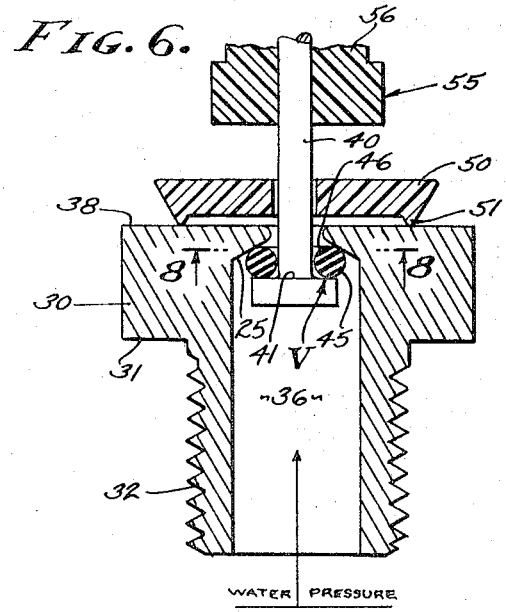
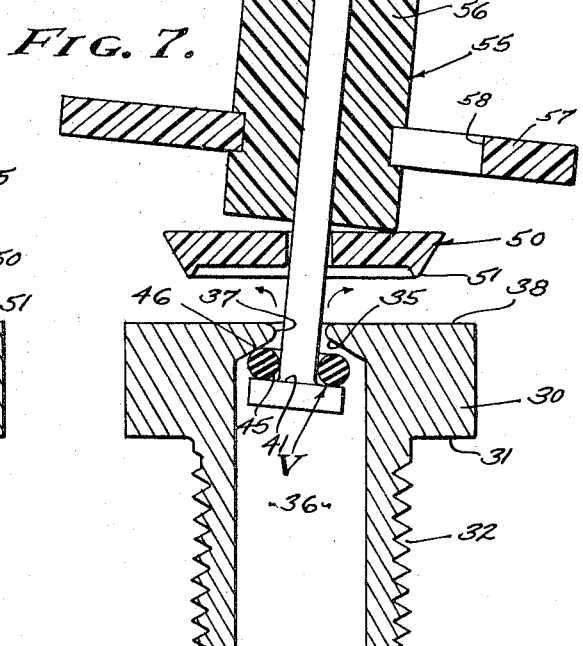

United States Patent Office 3,340,852
Patented Sept. 12, 1967

3,340,852
SELF-MAINTAINING POULTRY WATERER SYSTEM
Norman P. Nilsen, P.O. Box 33, Phelan, Calif. 92371
Filed Jan. 12, 1966, Ser. No. 520,205
9 Claims. (Cl. 119—75)

ABSTRACT OF THE DISCLOSURE

A watering device including a supply line having openings therein receiving valve members with water retaining vessels secured in place about the valve members, said valve members including actuation means to be moved laterally by fowl drinking from the vessel. Pneumatic fluid motion suppressing means are also secured at spaced intervals along the supply line.

---

This invention relates to a poultry waterer system and is particularly concerned with drinking apparatus that is self-maintaining, without resort to spring biased check valves, both as to proper supply of water and as to cleanliness with which said water is supplied, it being a general object of this invention to provide an improved and very practical apparatus for the watering of poultry as varied circumstances arise.

Ample watering and cleanliness are important factors in the raising of poultry such as chicks, it being necessary to provide water immediately following hatching for the purpose of preventing dehydration in the poultry, and cleanliness being necessary in order to avoid disease in the poultry.

Raising of fowl is conducted in cages as well as in yards and pens having dry ground. The newly hatched chicks normally commence drinking water during the first forty-eight hours or so of life, or when first placed in a brooder, this being an absolutely necessary function if dehydration is to be prevented. However, the usual commercially available waterers are not adequate in this respect in that they do not induce newly hatched chicks to drink and on the contrary involve a learning period during which dehydration and consequent loss of life is prevalent. Reference is made to nibbler type valves which usually depend or project horizontally, whether combined with a basin-like cup or not, and which do not automatically furnish a water level from which the fowl can drink. As a result, there are improvements in poultry watering apparatus as disclosed in my previous Patent No. 2,921,556 issued June 30, 1959, and which involves a float controlled fluid level that is applied to a plurality of waterer cups. However, float control waterers are somewhat complex, are sensitive and must be level, and are limited in use, although they advantageously furnish water in such a manner as to induce the chicks to drink as soon as they are able, and so that they can continue to drink therefrom through maturity, the apparatus being adjustable so as to accommodate the varying requirements of different sized fowl. To this end then it is an object of this invention to provide an extremely versatile and readily augmentable and/or diminishable apparatus to meet cage and/or pen requirements, and all with the maintainence of proper and acceptable hygienic conditions. That is, a generous supply of water is automatically initiated and maintained while profuse discharge of water is virtually eliminated and all wthout resort to leveling of the apparatus and without resort to float controls and other complicated valve arrangements. As a consequence, the newly hatched chicks are induced to drink as soon as they are able to do so, and the cage or pen is kept dry so that fungus and bacterial growths will not occur to interfere with the health of the fowl.

With the above generalities in mind it is nevertheless desirable to feed the fowl generously all the water that they need but not in such quantity that they can waste the same by throwing it about with their beaks. Furthermore, in the presence of feed and debris, cleaning of the apparatus is an important factor, and in the instant apparatus cleaning is inherent in the relationshp and operation of the parts involved.

An object of this invention is to provide a valve adapted for the immediate and automatic filling of a waterer cup to a plentiful condition upon application of fluid pressure thereto and to maintain said condition at the demand of the fowl drinking from the same, said fullness of the cup being determined by action of said valve without resort to other level controls etc. With the present invention, a substantially uniform fluid pressure selected from a wide range of operating pressures is applied to a manifold that communicates with a plurality of like waterers and each of which involves the valve structure that characterizes this invention.

Another object of the invention is to provide a valve structure for a waterer cup and which is independently operable to admit a plentiful supply of water to the cup, said fullness of the cup being determined without relation to other waterer cups, and all from a common manifold supplied with water at a substantially uniform pressure. In practice, the said water pressure is relatively low and each waterer cup is adapted to maintain itself in clean condition supplied with water and without being leveled with companion waterer cups and/or adjacently related manifolds carrying the same.

It is also an object of this invention to provide a waterer apparatus which is dependent upon water supplied within a suitable range of pressure for its operation and wherein vibrational frequencies as caused by water hammer are damped out, and to the end that limited as well as extensive installations are operable. With the present invention, for example, manifold units varying from a few feet in length to several hundred feet in length and mounting waterers on frequent centers as shown are successfully operated from a single water pressure source and without vibrational problems.

It is another object of this invention to provide a waterer of the type hereinabove referred to and wherein vibration suppressing means is combined with a control valve element to fill a cup upon demand, and wherein uncontrollable vibratory or pulsating movements of the valve element are virtually eliminated, such movements that would otherwise cause overflow of said cup.

It is still another object of this invention to provide an apparatus of the character referred to which involves but few simple and easily formed and assembled parts and which can be erected, installed and modified as circumstances require to fit the needs that arise in watering fowl on a large scale basis.

The various objects and features of this invention will be fully understood from the following detailed description of the typical preferred form and application thereof, throughout which description reference is made to the accompanying drawings, in which:

FIG. 1 is a transverse view taken through a typical valley type poultry cage, showing the waterer system of the present invention applied thereto. FIG. 2 is an enlarged perspective view of the elements comprising a vibration suppressing means of the present invention. FIG. 3 illustrates a typical arrangement of cages and the waterer systems as they are interrelated and supplied from a common source. FIG. 4 is an elevational view showing the waterer system alone and removed from the cage and taken as indicated by line 4—4 on FIG. 1. FIG. 5 is an enlarged sectional view taken as indicated by line 5—5 on FIG. 4. FIGS. 6 and 7 are enlarged sections of the valve of the waterer removed and shown separately from the cup or vessel thereof, FIG. 6 showing the valve seated and FIG. 7 showing the valve unseated. And FIG. 8 is a transverse section taken as indicated by line 8—8 on FIG. 6.

In the drawings I have shown the waterer system as it is used in watering fowl when penned within cages C, and to this end the waterer system requires a water supply A, and the waterer system involves generally, a waterer unit B, a manifold M and a suppressing means S for stopping fluid and mechanical oscillations and all harmonics thereof. The utility of the present invention is especially realized in the flexibility of extensiveness wherein a plurality of like or identical waterer systems, each of which can vary widely in its own extensiveness are arranged so as to be in operable communication with a common water supply A, and all without absolute regard to level. It is enough that the installation, regardless of extent, remain interconnected and all portions thereof positioned within a height subjecting the units B to workable water pressure.

The cages C can vary in form, and in some installations there may be no cages at all. However, it is most often necessary to employ cages as when ground conditions are not conducive to poultry raising, and in the drawings I have shown a typical valley type cage as they are commonly made of wire. In FIG. 1 and FIG. 3 the cross section of such a cage C is illustrated and which comprises a platform 10, front and back walls 11 and 12, and a top 13. The cages C are arranged back to back and the walls 12 thereof united as by longitudinal wires 14, and each other corner or margin is established and/or reinforced by such a wire 14. The collection of eggs is facilitated by inclination of the platform 10, and whereby the eggs that are laid by the poultry roll beneath the wall 11 to a trough 15 outside the compartment of the cage. It is between the united cages, for example, that the water system of the present invention is installed, and as is shown the valley type cage C is adapted to receive such a system. Such cages have reclined back walls 12 establishing a V-shaped recess extending coextensively with the cages that are arranged side by side in substantial number.

The arrangement of cages C can vary widely, a typical arrangement being shown in FIG. 3. That is, one or more levels of cages C is contemplated, a three level installation being shown. In actual practice a five level installation has been operated and wherein the fluid pressures remain within operable limits. Each row of back to back cages C carries a waterer system under control of an inlet valve 16, and there is a common supply piping 17 delivering water through a stand pipe 18 from a tank 19. The delivery pressure of the water supply A can vary widely and it has been found to be successfully operable at between two and ten pounds per square inch head of pressure. Thus, any suitable source of water under what I term light pressure and, for example, remaining substantially within the bounds above set forth is the environment to which the valve of the present invention is subjected.

The waterer systems can be constructed alike, in modular dimensions, and each involving the manifold M carried by the cages C or other suitable support, and a plurality of waterer units B and suppressing means S arranged in a series along the manifold. Further, at each waterer unit B there is the valve V which characterizes the present invention and which automatically establishes a plentiful supply of water in each cup. In carrying out the invention, each waterer system involves the straight horizontally disposed manifold M comprised of a tube or pipe with like or identical and upwardly faced openings 20 disposed in a common plane. The openings 20 are threaded on parallel axes normal to and intersecting the axis of the manifold pipe. Thus, there is a plurality of like openings spaced along one side of the manifold pipe, the upper side.

The cups at each waterer unit B are alike or identical and are provided to receive and to dispense water from the manifold M, and each is a vertically disposed vessel shaped part open at its top 21 and provided with a ported bottom 22 concaved for engagement on and in communication with the manifold. The cup is a cone shaped part with outwardly flared side walls 23 that terminate at the top 21, the top being in the form of a flat horizontally disposed peripheral flange. In practice, the top 21 is approximately three inches in diameter and tapers inwardly toward the bottom 22 approximately one inch in diameter. This particular configuration has been found to be successful in serving chickens, the cup being of molded plastic material or the like.

In accordance with this invention I provide the valve V that couples the cup of the waterer unit B on the manifold M and in controlled communication with the interior of said manifold. The valve V has a body 30 in the nature of a coupler having a shoulder 31 to clamp downwardly upon the top side of the bottom 22, and having a threaded depended cylindrical wall 32 threadedly engaged with the opening 20. Thus, the valve body 30 clamps the cup in working position on the top side of the manifold pipe, with sealed engagement by virtue of the plasticity in said body 30.

The body 30 of the valve V is fashioned to cooperatively carry the valve parts which control the supply of water to the cup. Functionally, it is desired that the cup be automatically and quickly filled to ½ or ¾ its height when fluid pressure is initially supplied to the system. And that only the fowl in drinking therefrom reduce that level before the cup is again refilled. And, these functions are automatic and inherent in the valve V which involves, generally, a valve seat 35, a valve pin 40, a valve seal 45, a baffle 50 and an actuator 55. The assembly of parts which forms the valve V is characterized by the valve pin 40 extending loosely through the body 30 and thereby capturing the seal 45 and baffle 50 in operating position relative to the body. The actuator 55 is applied onto the valve pin 40 in a manner to hold the valve parts in the assembled condition.

The body 30, as hereinabove described, is a cylindrical part that is threaded into the manifold M to clamp the cup in operative position. Further, the body 30 functions as a duct for delivery of water from the manifold into the cup, and to this end has an opening therethrough. As shown, the opening through said body comprises an enlarged chamber 36 of substantially greater cross section than the valve part that operates therein, and so that said part is free to move laterally therein. In practice, the chamber 36 is established as by drilling on an axis concentric with the body 30. In accordance with the invention the valve seat 35 is formed as by the angular leading cutting edges of a drill, preferably disposed at a 30° angle extending inwardly to a central discharge port 37 that opens at the top 38 of the body. Again, the port 37 is of such diameter as to pass the valve part extending therethrough with substantial clearance, and the annular valve seat 35 immediately underlies the top 38 and adjoins said top at the relatively sharp corner or minimum radius, as shown. Also, the top 38 is a flat surface disposed in a plane normal to the longitudinal axis of the body 30.

The valve pin 40 is a straight shaft-like part adapted to enter into the chamber 36 from above the top 38, to be operated by the actuator 55 and to operate the valve seal 45 relative to the valve seat 35. The valve seat 35 faces downwardly at the top of the chamber 36 while the valve pin 40 depends into the chamber through the port 37, where it has an annular shoulder 41 that opposes the seat 35. That is, the outer diameter of the shoulder 41 is substantially greater than the inner diameter of the part 37. Thus, the valve pin 40 presents a straight and upstanding shaft-like part that normally extends along the axis of the body 30 projecting through the port 37 with clearance so as to permit a rocking movement to be described.

The valve seal 45 is an annular part that surrounds the valve pin 40 and is captured in working position between the valve seat 35 and shoulder 41. In accordance with the invention the valve seal 45 and valve pin 40 are biased against the valve seat 35 entirely by water pressure within the chamber 36, and in order to have sealing engagement the seal has a rim 46 that has circular engagement with the said seat 35. In its preferred form the seal 45 is an O ring that closely and/or frictionally surrounds the valve pin 40 to be carried with the pin in engagement with the shoulder 41. Thus, the rim 46 is the outer and upper quarter peripheral face of said O ring. In accordance with the invention, the outer diameter of the valve seal 45 is substantially smaller than the inner diameter of chamber 36 surrounding the valve seat 35, in order to establish a flow restricting passage of annular configuration. And, as a result of the valve seat and valve seal configuration hereinabove described there is a lifting and centering action as water expells upwardly through the annular orifice existing between the valve seat 35 and valve pin 40, as well as a centering action when the valve seal 45 engages on the cone shaped valve seat 35. As a result, the valve pin 40 is biased and centered as and when water pressure is applied.

The baffle 50 is a plate like part that slips over the valve pin 40 to overlie the top 38 of the body 30. In practice, the baffle 50 is a disc of plastic material adapted to seal with the top 38 when engaged therewith. To this end the baffle 50 has a downwardly disposed peripheral lip 51 that engages the top 38 along a line of contact circumscribing the port 37. In practice, the said slip fit permits the baffle 50 to drop freely onto the top 38, and alternately to lift off the top when flow of water occurs. Normally, however, the baffle drops by gravity and engages the top 38 so as to preclude the downward precipitation of particles to the port 37. Additionally, the baffle 50 deflects water laterally in a fan-like configuration, and consequently prevents water from jetting vertically. An important feature is the agitation of the mash or sediment into suspension in the water so that it is consumed by the fowl.

The actuator 55 is provided for pivoting the valve pin 40 and valve seal 45 carried thereby, the fulcrum of said pivotal movement being the peripheral engagement of rim 46 on the valve seat 35. Therefore, the actuator 55 is adapted to cause displacement of the valve pin 40 from a normal position aligned with the axis of body 30 to an angularly disposed position, and involves a head 56 at the upper end of the valve pin 40 to be pecked at and/or nudged laterally so as to cause momentary misalignment of the valve pin. In practice, the acutator head 56 carries an extensive flange that overlies and provides increased leverage and contact surface which facilitates actuation by baby chicks, the flange being a disc that is normally disposed in a plane parallel to the top 38 and with its periphery terminating short of and concentric with the wall 23 of the cup. The flange 57 is radially slitted at 58 so as to facilitate removability. As shown, the head 56 is pressured onto the valve pin 40 and the flange 57 is a separate part removably snapped into a groove formed externally in the head. When so desired, as when adult birds are to be watered, it is normal practice to remove the flange 57. Axial movement for pivoting the valve is provided for by substantial clearance between the actuator head 56 and baffle 50, as shown.

In actual practice, the waterer system thus far described and without the suppressing means S is inoperative. Extensive installations (as well as minimal installations) of the manifolds M and multitude of cups (as well as a single cup) with their individual valves V are attendant with oscillatory motions or vibrational frequencies and harmonics thereof set into motion by inducements from outside sources and by operation of the valves V. Therefore, I provide the suppressing means S which stops this oscillatory phenomenon and to the end that vibrations are put down and virtually eliminated. Accordingly, the suppressing means S is combined with the manifold M that carries one or more waterer units B and as a practical matter is related according to its operational capacity with a group of waterer units B, say for example seven such units as is shown in FIG. 4. In the particular case illustrated the openings 20 face upwardly so as to carry the waterer units B on vertical axes although the disposition of these axes can vary depending upon the type of waterer used, and in any case the suppressing means S is to be vertically disposed as it will now be described. In accordance with the invention a vibration damping body is in communication with the fluid in the manifold M, preferably at frequent intervals along the same. The frequency of approximately every twenty feet is satisfactory for placement of a means S, where water is the fluid being dispensed the damping body is air. That is, the suppressing means S in its preferred form is a pneumatic means that absorbs energy from liquid motion or surges thereof as caused by inertial changes in the movement of water column and as caused by an other phenomenon. Therefore, the suppressing means S is in the form of an upwardly extended chamber that entraps a body of air to be compressed and/or expanded as pressure changes occur in the liquid occupying the manifold. As is shown, there is an air cell formed of a closed ended tube 60 in open communication with the interior of the manifold. In carrying out the invention the tube 60 can be of the same structural cross section as the pipe of the manifold and the uppermost and terminal end thereof is sealed.

A feature of the present invention is the capability of the air entrapment in the tube 60 of the suppressing means S to virtually stop oscillatory motion of practically all frequencies. To this end it is not only that water hammer is eliminated, but all oscillatory and vibrational motions are also eliminated, which otherwise range from about the speed of a person's heartbeat to speeds which cannot be detected with the eye. Accordingly, the tube 60 is of a relatively short vibratory length in comparison to the vibrational length of the manifold M and its connected piping and consequently the compression and expansion of air therein absorbs energy and is not sympathetic to vibrations in said manifold. As is shown, therefore, the tube 60 remains vertically disposed and maintains the entrapment of small bodies of air, at frequent intervals, thereby steadying the prevailing liquid pressure in the manifold M and to the end that the multitude of valves V remain biased and in a closed condition unless operated upon as hereinabove described. Thus, the snapping shut of valves V in harmony with the otherwise resonent frequency of a particular installation will not find resonence in that installation, due to the loss of energy absorbed by the air cells in the tubes 60 which are preferably short and of inherently too high a frequency to assist a continuance of motion and consequently absorb energy so as to effect a subsidence.

From the foregoing it will be apparent that a very practical arrangement of simple parts characterizes the present invention. The waterer units B are automatically filled to the approximate level specified when the water inlet valves 16 are initially opened, during closing of the valves T by the application of fluid flow therethrough. The cup supplying valve herein disclosed is to be distinguished from the nibbler type valves of the prior art and which require the education of the animals for their use. On the contrary, the instant combination of elements requires no learning to drink on the part of the fowl and presents automatically full reservoirs of water from which the fowl naturally drink without being taught to do so. It is significant that each reservoir cup is independently operable in establishing its own plentiful water level, to automatically fill and to maintain the same approximate level.

In actual practice, the fowl displaces the actuator 55 and attached valve pin 40, moving the same as a lever so as to pivot the valve seal 45 on the valve seat 35, and as a result the water gushes forth freely and lifts the baffle 50 to enter the cup. The refilling of the cup is in each instance momentary, but is accompanied by a definite rule of action determined by the necessity of the fowl to breath. Naturally, the fowl will displace the actuator 55 by nudging the same to one side in attempting to reach water and particles at the bottom of the cup. However, just as soon as the water level approaches the breathing openings, or covers the same, reflex action occurs and the fowl withdraws its beak and thereby releases the actuator, leaving the cup properly refilled. As a result of the above described replenishing action the fowl has a periodic opportunity to reach the bottom of the cup in order to clean out the same and to replenish the cup with fresh water, all as the result of the usual pecking habits of said fowl.

The immediate and automatic filling of the waterer units B induces the birds to start drinking naturally immediately when physically able to do so and which causes the birds to automatically touch the valves V and which results in more water entering into the cup. This fundamental action virtually eliminates dehydration such as is caused when employing systems where the birds must learn how to drink from nibblers and other types of cup systems. Newly hatched chicks are naturally clumsy at first and trip the valve V by stepping into the cup, and this raises the water level high in the cup and thereby attracts the birds to the water and results in avoiding dehydration. As the chicks become more agile and avoid stepping into the cup they naturally drink available water down to a normal level in the cup and which from then on keeps the cups clean. There is a wide and universal action of valve movement completely surrounding the waterer unit B, and there is a high leverage for easily breaking the water seal, due to the placement of the pivot point on the O ring seal closely surrounding the valve pin 40. With air chambers of the suppression means S the frequencies and oscillations that are initiated by ever so many sources are obstructed upon their inception and do not appear as valve movements, which would otherwise cause over filling of the cups.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A self-maintaining poultry waterer for dispensing water from a constant pressure supply thereof and comprising, an upwardly open vessel having a side wall of substantial vertical extent for the containment of a water level therein and having a bottom ported for the reception of water, and valve means for controlling the admission of water into the vessel through said ported bottom and including, a valve body at said bottom extending upwardly into said vessel and spaced from said side wall and having a downwardly faced valve seat therein above said bottom of the vessel surrounding a discharge port into said vessel, said valve seat terminating substantially adjacent a top portion of the valve body, a valve pin extended into the body loosely through said port, there being an annular valve seal carried on the lower end of the valve pin and biased by said constant pressure supply into engagement with the valve seat to close the port, and the upper end of the valve pin being exposed and adapted to be displaced laterally by the poultry thereby to misalign the valve pin and pivoting one peripheral side of the valve seal on the valve seat and lifting the other peripheral side of the valve seal so as to admit water to the vessel through said port.

2. A self-maintaining poultry waterer as set forth in claim 1 wherein, the valve body top through which the discharge port opens and the downwardly faced and surrounding valve seat adjoin at a relatively sharp corner, and wherein the annular valve seal is carried on the lower end of the valve pin with flow restricting clearance within said chamber.

3. A self-maintaining poultry waterer as set forth in claim 1 wherein, there is a radially disposed head on the upper end of the valve pin and spaced upwardly from the valve body and spaced laterally inward from the said side wall of the vessel and exposed to said displacement toward the said side wall by the poultry.

4. A self-maintaining poultry waterer as set forth in claim 1 wherein, the valve body top through which the discharge port opens and the downwardly faced and surrounding valve seat adjoin at a relatively sharp corner, wherein the annular valve seal is carried on the lower end of the valve pin with flow restricting clearance within said chamber, and wherein there is a radially disposed head on the upper end of the valve pin and spaced upwardly from the valve body and spaced laterally inward from the said side wall of the vessel and exposed to said displacement toward the said side wall by the poultry.

5. A self-maintaining poultry waterer as set forth in claim 1 wherein, there is a baffle slipped for independent movement over the valve pin and retained thereon to engageably overlie the top of the valve body by a head on the valve pin spaced above the top of the valve body, said baffle acting to deflect water from the port.

6. A self-maintaining poultry waterer as set forth in claim 1 wherein, there is a baffle slipped for independent movement over the valve pin and retained thereon to engageably overlie the top of the valve body by a head on the valve pin spaced above the top of the valve body, and said baffle having a peripheral depending lip to seal with the body top and to deflect water from the port and toward the bottom of the vessel.

7. A plurality of self-maintaining poultry waterers as set forth in claim 1 supplied from a common manifold, and wherein, there is a fluid motion suppressing means which includes a body of higher resonant frequency than the resonant frequency inherent in the water in said common manifold and waterer cups and in communication with the water of lower resonant frequency and under pressure within the manifold to absorb energy caused by movement thereof and to inhibit resonant frequencies and harmonics.

8. A plurality of self-maintaining poultry waterers as set forth in claim 1 supplied from a common manifold, and wherein, there is a pneumatic fluid motion suppressing means of higher resonant frequency than the resonant frequency inherent in said common manifold and waterer cups and which comprises a vertically disposed tube of entrapped air in communication with the manifold and the self-replenishing waterer cups.

9. Interconnected groups of self-maintaining poultry waterers as set forth in claim 1 supplied from a common manifold and wherein, there are separate pneumatic motion suppressing means of higher resonant frequency than the resonant frequency inherent in said common manifold and waterer cups and each of which means comprises a vertically disposed tube of entrapped air in communication with the manifold at the group of self-replenishing waterer cups to which it is associated.

References Cited

UNITED STATES PATENTS

| | | | |
|---|---|---|---|
| 1,986,928 | 1/1935 | Hanson | 119—75 |
| 2,710,594 | 6/1955 | Thompson | 119—72.5 |
| 2,921,556 | 1/1960 | Nilsen | 119—74 |
| 2,939,424 | 6/1960 | Frederiksen | 119—72.5 |
| 3,008,451 | 11/1961 | Curry | 119—72.5 |
| 3,215,119 | 11/1965 | Graham | 119—75 |

SAMUEL KOREN, *Primary Examiner.*

HUGH R. CHAMBLEE, *Examiner.*